UNITED STATES PATENT OFFICE.

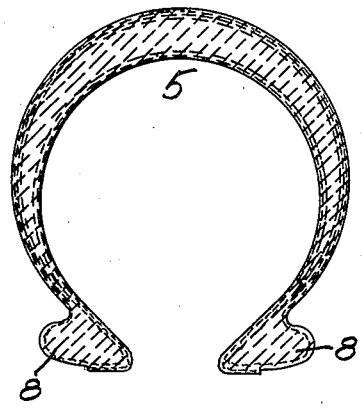
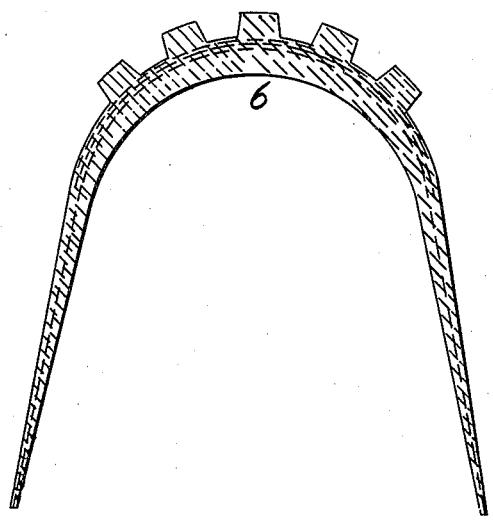
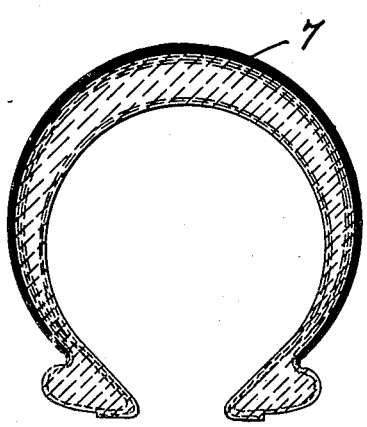
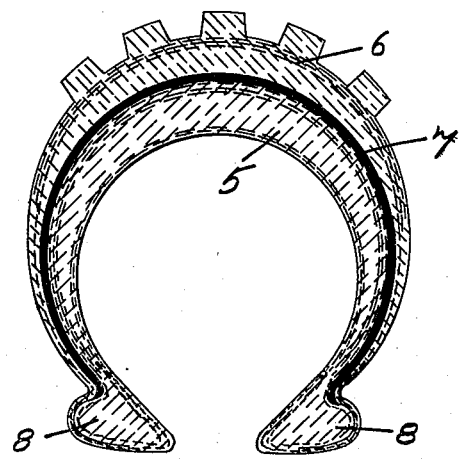

CHARLES W. YELM, OF DENVER, COLORADO, ASSIGNOR TO THE GATES RUBBER COMPANY, OF DENVER, COLORADO, A CORPORATION OF COLORADO.

REPAIRED TIRE.

1,352,164. Specification of Letters Patent. Patented Sept. 7, 1920.

Application filed March 11, 1920. Serial No. 365,030.

*To all whom it may concern:*

Be it known that I, CHARLES W. YELM, a citizen of the United States, residing at the city and county of Denver and State of Colorado, have invented certain new and useful Improvements in Repaired Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tires which comprise worn casings to which there have been applied repair tires, or so-called "half-soles".

The object of the invention is to provide such a structure in which the repair tire or half-sole is securely applied to the worn casing by the employment of a bonding layer of raw gum or rubberized compound between the two members, and without in the first instance subjecting the raw gum to vulcanization, the latter, however, being of such composition that it will be gradually vulcanized by the heat generated incident to the use of the tire.

After the outer surface of the worn casing is buffed off and smoothed down, the raw gum is applied and the repair tire finally put in place in direct contact with the gum.

An important advantage of this construction is that by reason of the fact that the bonding layer of gum is not vulcanized originally, the carcass and repair tire escape injury which would otherwise result due to over-vulcanization, whereas the low heat generated during use and incident thereto, and which is sufficient to vulcanize the raw gum, does not injuriously affect the other parts of the tire.

Furthermore, where a repair tire has been applied to the carcass of an old casing in the usual manner, as by the employment of a thin coat of rubber cement or compound, it has been found that the deformation of the tire due to contact with the road during use, has a tendency to loosen the repair tire because the cement bond between the repair tire and the carcass is so thin that the holding capacity of the bond is insufficient to prevent separation. Under these circumstances, as soon as the bond is broken between the two parts, a rubbing or abrading action results which soon wears the tire to such an extent that blow-outs result.

The present improvement is designed to completely obviate difficulties of this character, and as above stated comprises the employment of a layer of raw gum or rubberized compound of substantial thickness between the adjacent surfaces of the worn casing and the repair tire, this raw gum or rubber compound being of such composition as to secure the two members in proper coöperative relation, and of such thickness as to permit the deformation or deflection of the outer member or repair tire incident to road work without loosening the bond between the two members.

The layer of raw gum or rubberized compound forms a cushion between the two members of sufficient magnitude to permit the said deformation or deflection without interfering in any way with the security of the bond resulting from the use of said raw gum or rubber compound positioned as above explained. This is true independently of the vulcanizing feature.

In the accompanying drawings, which set forth the present invention,

Figure 1 is a cross section illustrating the worn casing after being buffed down ready to receive the repair tire or half-sole.

Fig. 2 is a cross section of said repair tire.

Fig. 3 is a cross section of the casing showing the layer of raw gum or rubberized compound applied preparatory to positioning the repair tire thereon.

Fig. 4 is a cross section of the completed structure, showing the carcass, repair tire, and the interposed cushioning and bonding layer of raw gum or rubberized compound.

In the drawings, the carcass or casing of a worn tire, after being buffed down, is indicated at 5. The repair tire or half-sole to be applied over the carcass 5 is shown at 6, this repair tire taking the place of the original tread of the casing.

In carrying out the process, a layer or strip 7 of bonding or cushioning material of substantial thickness is applied preferably to the outer surface of the carcass 5. It is within the invention to apply this layer 7 to the inner surface of the repair tire 6, although this could not be done so easily. The cushioning and bonding layer 7 is composed of raw gum or rubberized compound, which preferably covers the entire adjacent surfaces of the two members 5 and 6 down to the heads 8 of the casing. This compound is of such composition that it will form a suitable bond between the two members and form a cushion therebetween which will permit of the deformation of the tire due to road work without loosening or interfering with the proper security or holding capacity of the said bond.

After the layer 7 of raw gum or rubberized compound is applied to the outer surface of the carcass 5, the repair tire 6 is put in place in the usual manner, the extremities of the side strips or members of the repair tire 6 being carried around the beads 8 of a clencher tire in such a manner as to be properly engaged and held by the rim.

In a construction of this class, the heat generated in the tire during use on the road will serve to vulcanize or properly cure the original raw gum or rubberized compound to such an extent that the bond or union between the two parts will become more secure during the use of the tire. The gum or compound of which the layer 7 is composed is of such character that it will set subsequent to application of the repair tire without the employment of artificial heat. The consistency of this gum or compound is such when applied to the tire, that before it has become cured or set it distributes itself over the tire or used casing in such a manner as to fill up any uneven places which might be present.

The process of forming a tire of this character is set forth and claimed in my application filed December 8th, 1919, Serial No. 343,273.

I claim:

1. In combination, a worn casing, a repair tire applied thereto, and a layer of rubberized compound establishing a bond therebetween, said layer of compound being unvulcanized prior to road use, and having such character and thickness as to form a cushioning bond between the members which bond is maintained during use.

2. In combination, a worn casing, a repair tire applied thereto, and a layer of rubberized compound establishing a bond therebetween, said layer being unvulcanized before putting into use, and of such consistency that it fills any unevenness in the adjacent faces of the parts and of such character and thickness that the bond is maintained during road use.

In testimony whereof I affix my signature.
CHARLES W. YELM.